April 15, 1958  H. WITT  2,830,924
METHOD OF LAMINATING A THERMOSETTING RESIN
AND A LIGNO-CELLULOSE SHEET MATERIAL
TO OVERCOME WARPAGE
Filed March 17, 1955
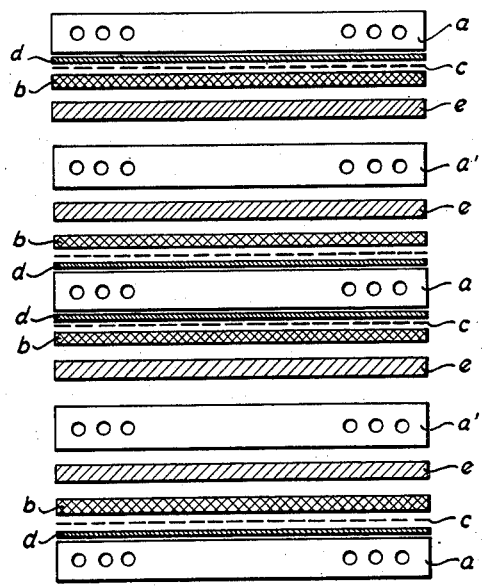
INVENTOR
Herbert Witt

United States Patent Office 2,830,924
Patented Apr. 15, 1958

2,830,924

METHOD OF LAMINATING A THERMOSETTING RESIN AND A LIGNO-CELLULOSE SHEET MATERIAL TO OVERCOME WARPAGE

Herbert Witt, Horn, Lippe, Germany

Application March 17, 1955, Serial No. 494,935

Claims priority, application Germany May 31, 1954

1 Claim. (Cl. 154—110)

This invention relates generally to laminates, and more particularly relates to a method of manufacturing a laminate consisting of a carrier sheet containing ligno-cellulose and provided with a thermosetting artificial resin cover.

It has been proposed to provide a laminate by coating to one surface or preferably to both surfaces of spraying or otherwise applying to ligno-cellulose sheets, such as wood, veneers, fiber boards or the like, a cover of synthetic resin consisting of phenol formaldehyde, urea-formaldehyde, melamine or the like thermosetting synthetic resins. This may be effected by applying to the sheets one or more paper films impregnated with artificial resin. The resulting laminates are then hardened or set in a press under pressure and at a temperature of 90° to 180° centigrade. For example, the laminates may be pressed in a heated, multi-platens press in such a manner that all the platens have a temperature necessary to harden or set the laminates. Laminates manufactured in such a manner are then cooled under pressure in the press after the heated step.

Such laminates have the advantage that they are highly insensitive against mechanical, chemical and thermal action and may easily be kept clean so that they are used frequently in the furniture industry for making cabinets, tables, chairs, ice boxes and the like as well as in the construction, airplane and ship building industries as building elements for walls, particularly for wall cover plates. However, such laminates have the drawback that they easily warp or become curved due to the moisture in the air; they can only be made plane again by applying large forces to the laminates whereby the hard artificial resin surface may crack. These disadvantages are caused by the fact that the ligno-cellulose containing sheets lose most of their moisture during pressing in the hot press up to a very small percentage and later absorb again moisture from the air whereupon they are twisted and warped.

In order to overcome these drawbacks it is conventional practice to provide not only the front surface but also the rear surface of the sheets with an artificial resin cover in order to prevent moisture from penetrating into the sheet. However, a sheet covered on both sides with a resin cover is very difficult to glue to another surface, because the naturally well adhering surface of the sheet is covered by the resin layer or cover. Such a laminate can only be glued by roughening one of its resin-covered surfaces. Furthermore, even sheets which have been provided on both surfaces with a resin cover still absorb some moisture from the air over a period of time so that bending or warping thereof cannot be completely avoided.

It has also been suggested to add to the ligno-cellulose sheet large amounts of artificial resin, bitumen, paraffines or hardening oils to prevent swelling up of the ligno-cellulose sheet. However, this procedure greatly increases the cost of the sheets and warping or curving of the sheets cannot completely be prevented in this manner.

It is, accordingly, an object of the present invention to provide a process for the manufacture of a laminate which will overcome the disadvantages of prior art laminates.

Another object of the invention is to provide a process for the manufacture of a laminate, which laminate will substantially not warp when exposed to humid air.

In accordance with the present invention the moisture content of the ligno-cellulose sheet of the laminate is either maintained or brought to such a value during the hot pressing thereof that the moisture content of the laminate is in hygroscopic equilibrium with the relative humidity of the air to be expected in the geographic zone or area where the laminate is to be used. This may simply be effected by not heating the press platens adjacent the rear surface of the ligno-cellulose sheet. The invention is based on the recognition of the fact that there is little change in the tension or warping forces to which the laminates are subjected in a relative humidity range of about 40% to about 70% which the atmosphere of the temperate zone exhibits. Hence, such a laminate having a moisture content which remains within this range during the pressing operation is not subjected thereafter to any noticeable warping or curving. If the laminates are to be used in particularly humid locations, moisture must be added to the ligno-cellulose sheets during the hot pressing process until they acquire the moisture content prevailing in the surroundings for which they are intended. This may easily be effected by providing an intermediate layer having an excess of moisture between the rear surface of the ligno-cellulose sheet and the press platen. In this manner warping or curving of the laminates is effectively and simply eliminated. Furthermore, the process of the invention has the following advantages.

A considerable amount of energy is saved because it is only necessary to heat one-half of the press platens in the multiplaten press. Moreover, an increased yield is obtained because the laminates cool relatively rapidly which has the further advantage that the rapid cooling prevents the bright or polished-appearing synthetic resin layer from becoming dull. Due to the rapid cooling a corresponding rapid contraction of the bright or polished sheet which supports the artificial resin layer is obtained whereby a polishing effect is produced on the artificial resin layer so that the resin cover becomes very smooth and bright and acquires a high polish. In particular it again becomes possible to provide only one surface of the ligno-cellulose sheets with an artificial resin cover. Consequently, the cost of the laminates is further reduced and the naturally rough reverse surface of the ligno-cellulose containing ligno-cellulose sheets is preserved and may be used to glue the sheet to any other surface.

In the accompanying drawing, the single figure is a diagrammatic, sectional view of the press of the invention for manufacturing laminates in accordance with the invention.

Essentially, in accordance with the present invention one surface of a ligno-cellulose containing material, such as wood, veneer, hard fiber plates or the like is used as a carrier and by means of spraying or applying a thermosetting synthetic resin of phenolic, urea, melamine or the like thermosetting resins or by applying one or more impregnated films with a synthetic resin, having organic or inorganic fibers as carrier and which preferably are dyed or printed with pigments. Such a product is pressed in a press or in a multi-platen press at a pressure up to 100 kg./cm.$^2$ at temperatures of about 90° to about 180° centigrade and for a duration of about 4 to about 30 minutes. The pressing operation is effected in such a manner that the pressed laminate has a relative humidity corresponding to the relative humidity of the air, preferably of 40% to 70% depending upon the climate where the laminate is intended to be used, and for particularly humid rooms may have a relative humidity corresponding to a relative humidity of air of 80% to 90%. Furthermore, the laminate should be perfectly plane. In accordance with the invention this is achieved by heating the press platens which are in contact with the artificial resin cover to be hardened to the hardening or setting temperature while the opposite platens are not used as heating platens but as cooling platens. It should be emphasized that in accordance with conventional practice both the upper and lower platens of the press are heated to the temperature necessary for binding and setting or hardening the plate.

The single figure shows a portion of a multi-platen press which is adapted for the manufacture of four laminates. The first and second press platens $a$, $a'$ may be heated or cooled as is conventional. However, in accordance with the present invention the second press platens $a'$ which are adjacent the rear surfaces of the ligno-cellulose sheets $b$ are cooled during the pressing operation, or at least they are maintained at a substantially lower temperature then the first platens $a$. The synthetic resin layers $c$ are disposed on the upper surfaces of the ligno-cellulose sheets $b$. The smooth or polished sheets $d$, in turn, are disposed on top of the artificial resin layers $c$ to produce a high gloss cover on the laminates. In order to prevent that the press sheets $d$ drop onto the laminates when the press is opened, the press sheets disposed on the lower surfaces of the first press platens $a$ are rigidly connected with the press platens while the press sheets disposed on the upper surface of the press platens $a'$ may be loosely stacked thereon.

Furthermore, in accordance with the present invention, in order to control the moisture contents of the laminates during the pressing operation and in order to provide an equalization of the pressure during pressing a support plate may be used which may be an elastic plate containing an excess of moisture such as a wet fibrous plate, wool felt, asbestos felt or the like. Furthermore, it is feasible to utilize a support plate such as rubber which assures a water vapor impregnable seal of the hard fibrous wood carrier plate.

Consequently, between the rear surface of the ligno-cellulose sheets $b$ and the press platens $a'$ there is disposed an intermediate layer $e$ which may consist of various materials. For example, if the moisture content of the ligno-cellulose sheets $b$ during pressing is to be maintained substantially at the same value it is appropriate to provide an intermediate layer of rubber or the like water impervious material. On the other hand, if it is desired to increase the moisture content of the ligno-cellulose sheet, it is to be recommended to utilize an intermediate layer which is impregnated with water such as, for example, an asbestos layer.

The drawing shows a portion of the multi-platen press in the open position.

Further in accordance with the invention, after the artificial resin layer or the resin film has been hardened or set, the hot platen may be cooled with advantage to a temperature of below 100° centigrade.

The present invention makes it possible to reduce the large temperature gradient within the ligno-cellulose sheet by cooling the plate from its rear surface. The additional introduction of moisture during the pressing operation or the reduction of the drying out of the ligno-cellulose sheet make it possible to provide a laminate which is in hygroscopic equilibrium with the atmosphere at its intended point of use. At the same time the surface covered with the synthetic resin is improved. The result of the process of the invention is a laminate having a cover on one surface of artificial resin and which remains plane in the climate for which it is intended.

At the same time the cause of the warping is removed which occurs in prior art laminates having one surface covered with a thermosetting artificial resin and the other surface of which is either not protected at all or by inferior films or covers and which are obtained by pressing between two heated platens in accordance with the previously known process. In accordance with the prior art process the ligno-cellulose sheet is heated so strongly and rapidly by a flow of heat simultaneously from the upper and lower platens that after one minute duration of the pressing the temperature of the sheet rose to 100° centigrade whereby the laminate is dried very rapidly. The final setting of the laminate takes place in accordance with the old process in a state where the hygroscopic equilibrium of the ligno-cellulose sheet corresponds to a relative humidity of the air of between 10% and 20% which is too low even for the temperate climates and consequently causes subsequent warping and swelling. Even a subsequent cooling of these laminates under pressure does not remedy this defect although it causes a considerable equalization and an increase of the gloss of the surface. At the same time such a previously proposed process is not economically practical where the entire laminate and particularly the ligno-cellulose sheet has to be brought to the hardening or setting temperature of the film or resin cover.

One of the advantages of the invention is that it is possible for the first time to manufacture laminates of this type having a cover only on one surface and which remain plane in a particular or predetermined climate. The advantage of a laminate in accordance with the present invention consists besides its cheap, simple and faster manufacture in a better utilization of the expended heat, a better, easier working of the laminate and the ability to remain plane in a predetermined climate. This advantage is particularly important in working the laminates in the furniture industry as well as for putting up plane wall covers by means of rapid acting artificial resin glues. For the first time the laminates of the invention make possible a faultless working of laminates of this kind having a covering layer on one surface to be used for covering large areas such as are required in the furniture industry.

Since certain changes in carrying out the above invention could be made without departing from the scope thereof, it is intended that all matter contained in the above description or shown in the accompanying drawing shall be interpreted as illustrative and not in a limiting sense.

It is accordingly desired that in construing the breadth of the appended claim it shall not be limited to the specific exemplifications of the invention described herein.

What I claim is:

In the method of bonding a ligno-cellulose sheet to a layer of thermosetting synthetic resin under heat between pressure platens, that improvement comprising maintaining the platen adjacent the outer face of said ligno-cellulose sheet in a cool condition while maintaining the other platen in a heated condition, interposing a solid fibrous sheet containing water between said platen adjacent the outer face of said ligno-cellulose sheet and said outer face of said ligno-cellulose sheet, said solid fibrous sheet containing an amount of water which is releasable to said ligno-cellulose sheet, said amount of water being sufficient to compensate for the moisture lost during said bonding under heat between pressure platens whereby the water released to said ligno-cellulose sheet during bonding overcomes the tendency of the finished product to warp.

(References on following page)

References Cited in the file of this patent

UNITED STATES PATENTS

| | | |
|---|---|---|
| 1,129,933 | Wiedemann | Mar. 2, 1915 |
| 1,851,177 | Harvey et al. | Mar. 29, 1932 |
| 1,942,251 | Mains | Jan. 2, 1934 |
| 2,314,797 | Morris et al. | Mar. 23, 1943 |
| 2,418,233 | McClary | Apr. 1, 1947 |
| 2,478,943 | Rhodes | Aug. 16, 1949 |
| 2,562,711 | Gessler et al. | July 31, 1951 |

FOREIGN PATENTS

| | | |
|---|---|---|
| 654,645 | Great Britain | June 27, 1951 |